United States Patent [19]

Nagata et al.

[11] Patent Number: 4,688,354
[45] Date of Patent: Aug. 25, 1987

[54] TABLE FEED APPARATUS

[75] Inventors: Tetsuya Nagata; Osamu Ohashi, both of Narashino, Japan

[73] Assignee: Seiko Seiki Kabushiki Kaisha

[21] Appl. No.: 890,496

[22] Filed: Jul. 25, 1986

[30] Foreign Application Priority Data

Nov. 21, 1985 [JP] Japan ............................ 60-262082

[51] Int. Cl.$^4$ ............................................. B24B 49/00
[52] U.S. Cl. .................................. 51/165.8; 51/34 C; 51/165.93; 51/165.89; 74/836; 74/571 R
[58] Field of Search ................ 74/836, 571 R, 571 L, 74/571 M; 51/165.93, 165.89, 165.88, 165.8, 34 C, 34 K

[56] References Cited

U.S. PATENT DOCUMENTS

| | | | |
|---|---|---|---|
| 2,108,029 | 2/1938 | Connor | 51/34 K |
| 2,348,958 | 5/1944 | Celio | 74/571 |
| 3,375,732 | 4/1968 | Voeller | 74/571 |
| 3,919,810 | 11/1975 | Voumard | 51/165.93 |

Primary Examiner—Harold D. Whitehead
Attorney, Agent, or Firm—Bruce L. Adams; Van C. Wilks

[57] ABSTRACT

A grinder wheel table feed apparatus which converts a rotation of the table driving motor into a reciprocation movement of the grinder wheel table through a ball-screw mechanism and exerts a traverse movement to the table between a stand-by position and a working position. Additionally, a device of the invention converts a rotation of a reciprocation axle drive motor into a reciprocal movement of said table through an eccentric cam, and it also exerts an oscillation operation to the table in its working position. A drive control means of said eccentric cam is comprised of an encoder operable to read a rotation position of the reciprocal axle drive motor and to control same through a control device so as to be effective to stop the eccentric cam at a predetermined angle.

12 Claims, 9 Drawing Figures

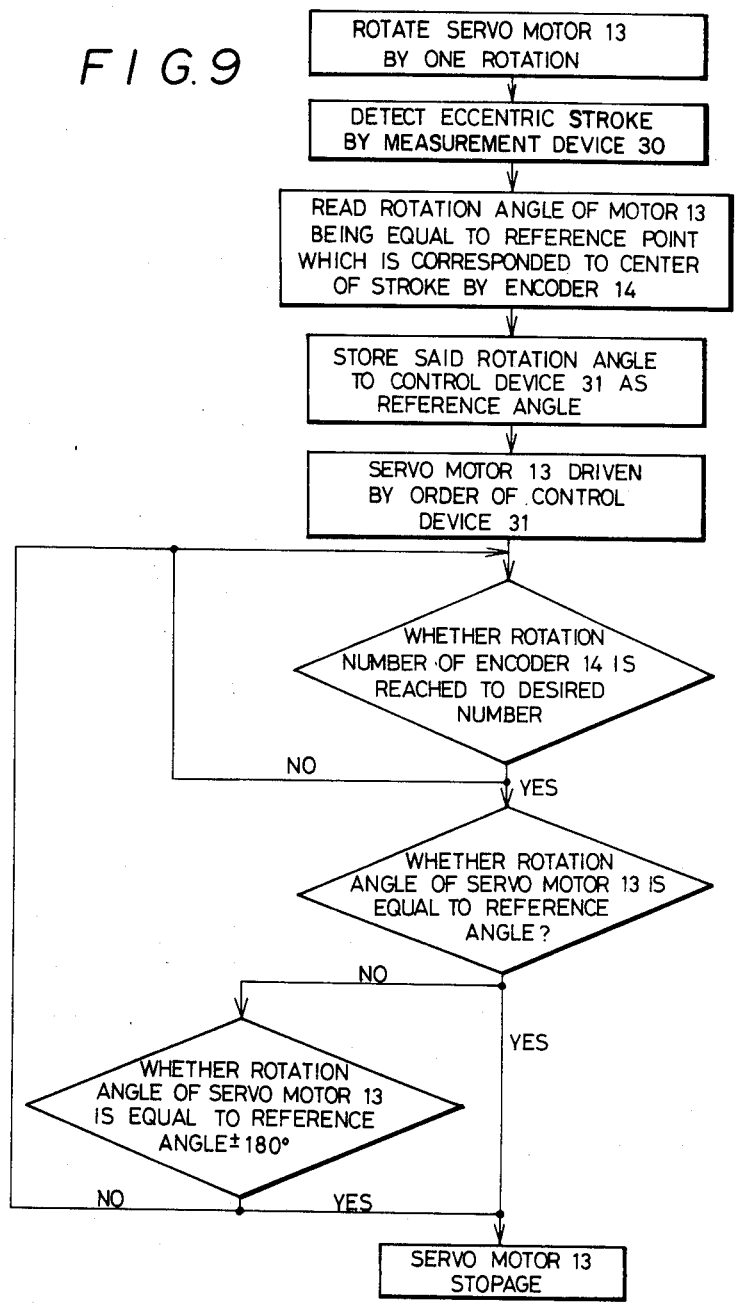

TABLE FEED APPARATUS

BACKGROUND OF THE INVENTION

This invention relates to a table feed apparatus for reciprocating a table of grinder machines and the like.

For instance, in an internal grinder machine, there is mounted an oil-cylinder under the table thereof and by driving the oil-cylinder, the table is caused to rapidly transfer from a stand-by or non-working position to a working position (called a traverse movement) and by rotatably driving an eccentric cam assembly, which is provided to another end of the reciprocation axis or axle protrudingly extending from the cylinder, keeping the cylinder to its position, a grinder wheel is caused to undergo a reciprocation movement (called an oscillation movement). In addition, in a conventional state of the art device said eccentric cam assembly is comprised of a slide-ring being fixed on the reciprocation axis and an eccentric cam being slidably connected forwardly or backwardly of the transfer direction within the slide-ring and a drive shaft for rotating the eccentric cam such that by rotatably driving the drive shaft, the eccentric cam exerts an eccentric movement and by slidably connecting to the inner side of the slide-ring, the table exerts a reciprocation movement in response to the eccentric amount of the eccentric cam.

Further, said eccentric cam has a double ring configuration and an outer cam of which is connected to the inner wall of the slide-ring such that it constrains the traverse component force as well as possible and is adjustable only along the axis direction of the reciprocation axis. But, in the aforementioned table feed apparatus, an oil-cylinder is employed as a drive means of traverse movement such that it becomes impossible to exert a low speed feed to the workpiece. Thus the grinding is very limited.

Further, as far oscillation movement of the grinder table, the eccentric position of the eccentric cam is not so constant that the table is not accurately positioned. Accordingly, if the oscillation stroke needs to be changed, it is necessary to return the eccentric cam to the reference position and after that change the stroke thereof, hence the eccentric cam is troublesome in its stroke adjustment operation and its operation efficiency is very deteriorated.

As mentioned above, with the old table feed device it is difficult to carry out a low speed feeding, and the table is not accurately positioned with reference to the oscillation movement. As a grinder wheel table feed apparatus for use in said low speed feeding, there has been proposed a table which has attached therein a drive motor and a ball-screw being connected thereto. But, a fault with said proposal is that said table can not realize a high speed oscillation movement.

SUMMARY OF THE INVENTION

This invention is completed in view of said backgrounds. This invention is intended to provide an epoch-making table feed apparatus which makes it possible to carry out both low speed feeding and high speed oscillation movement and to normally position the table to its accurate position when the oscillation movement is stopped.

This invention has been made in order to accomplish said objects and relates to a table feed apparatus wherein it converts a rotation of the table driving motor into a reciprocation movement of the table through a ball-screw mechanism, and it exerts a traverse movement to the table between a stand-by position and a working position and in addition, it converts a rotation of a reciprocation axis or axle drive motor into a reciprocal movement of said table through an eccentric cam, and it also exerts an oscillation operation to the table in its working position. This invention is characterized in that a drive control means of said eccentric cam is comprised of an encoder operable to read a rotation position of the reciprocation axle drive motor and a control device for controlling the rotational drive of the motor so as to be effective to stop the eccentric cam at a predetermined angle.

BRIEF DESCRIPTION OF THE DRAWINGS

FIG. 9 is a flow-chart thereof.

DETAILED DESCRIPTION OF THE INVENTION

Figure 1:
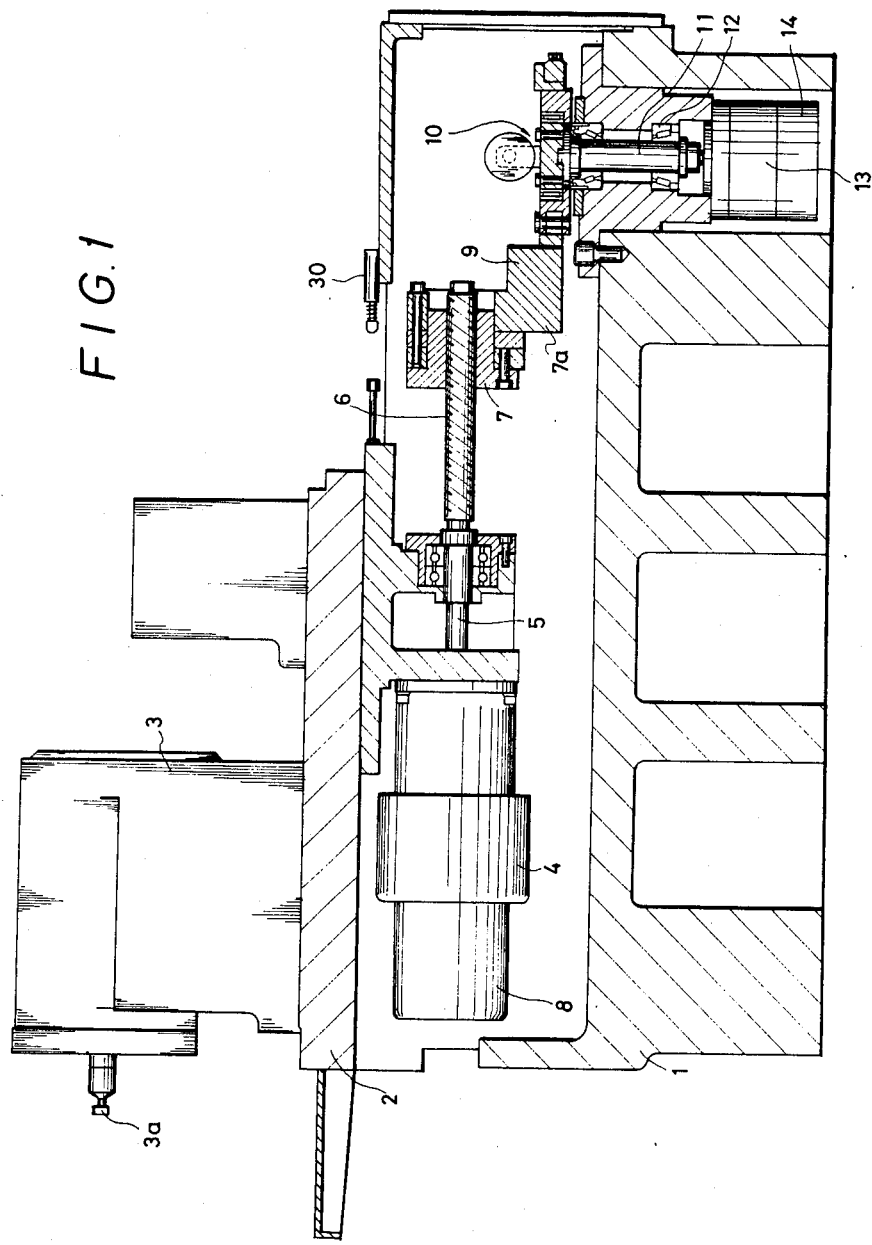
FIG. 1 is a longitudinal cross-sectional view of a first embodiment wherein a table feed apparatus according to this invention is applied to a small internal grinder machine.

Referring now to the drawings, embodiments of the invention will be detailedly explained with reference to the attached drawings.

Figure 2:
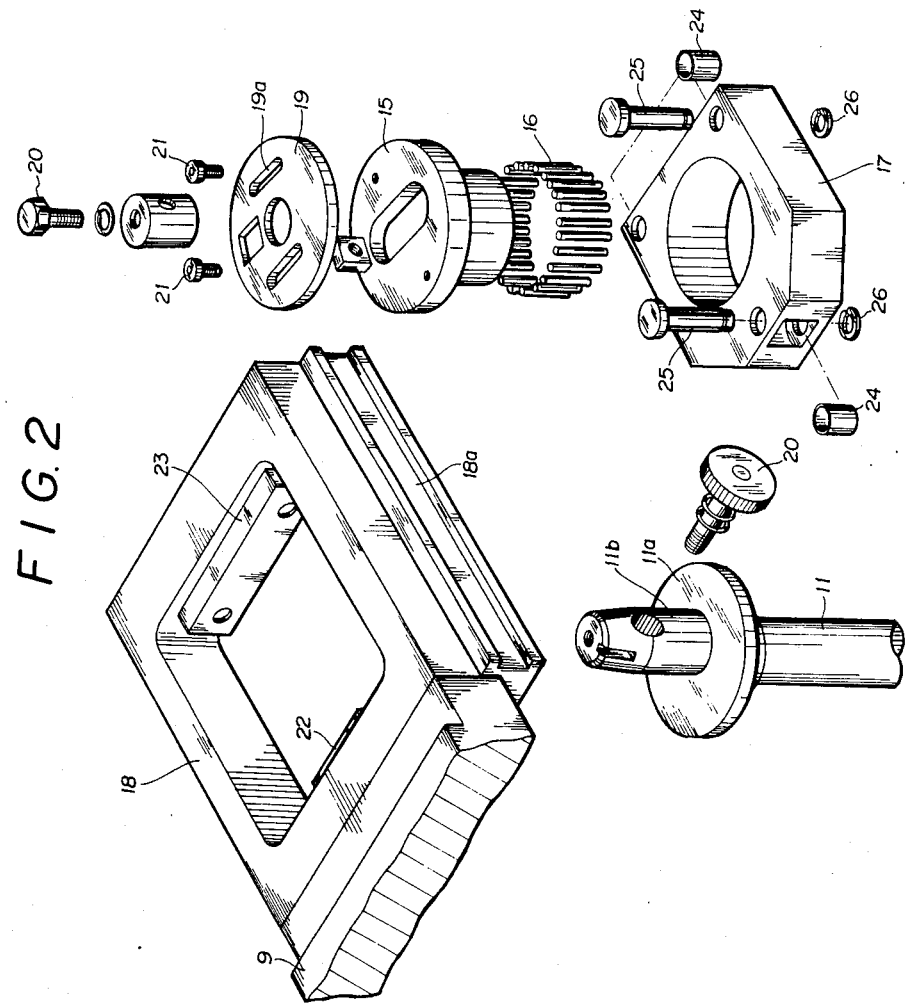
FIG. 2 is a disassembled perspective view of FIG. 1 to illustrate the main part thereof.
Figure 3:
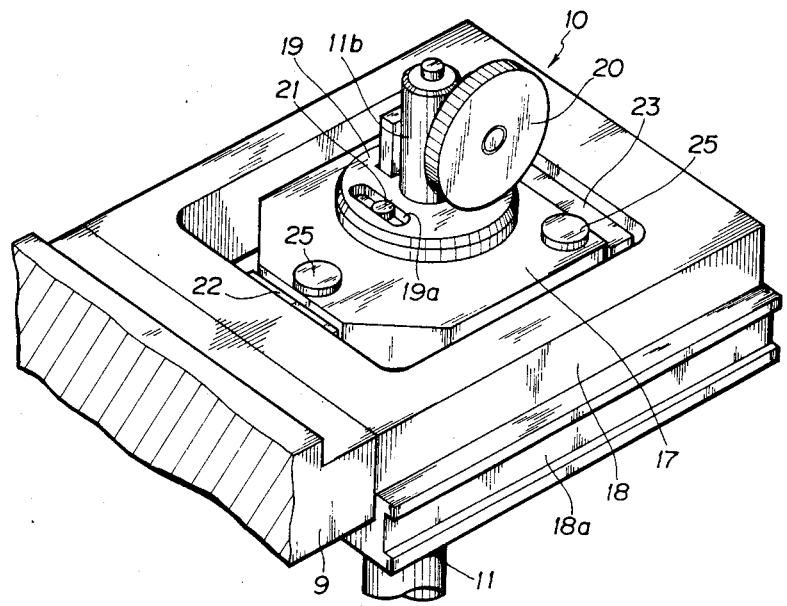
FIG. 3 is a perspective view of FIG. 1 to illustrate the assembled state.
Figure 4:
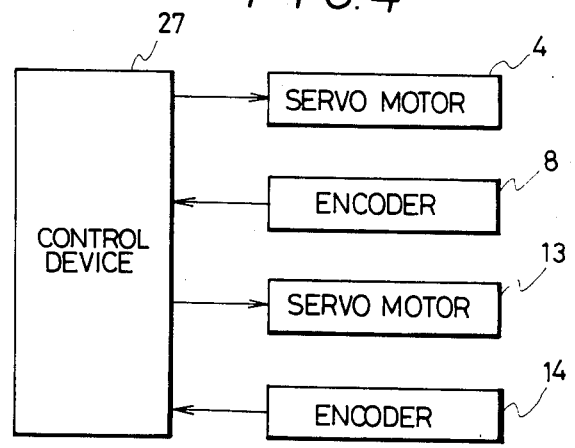
FIG. 4 is a system block diagram associated with the first embodiment.
Figure 5:
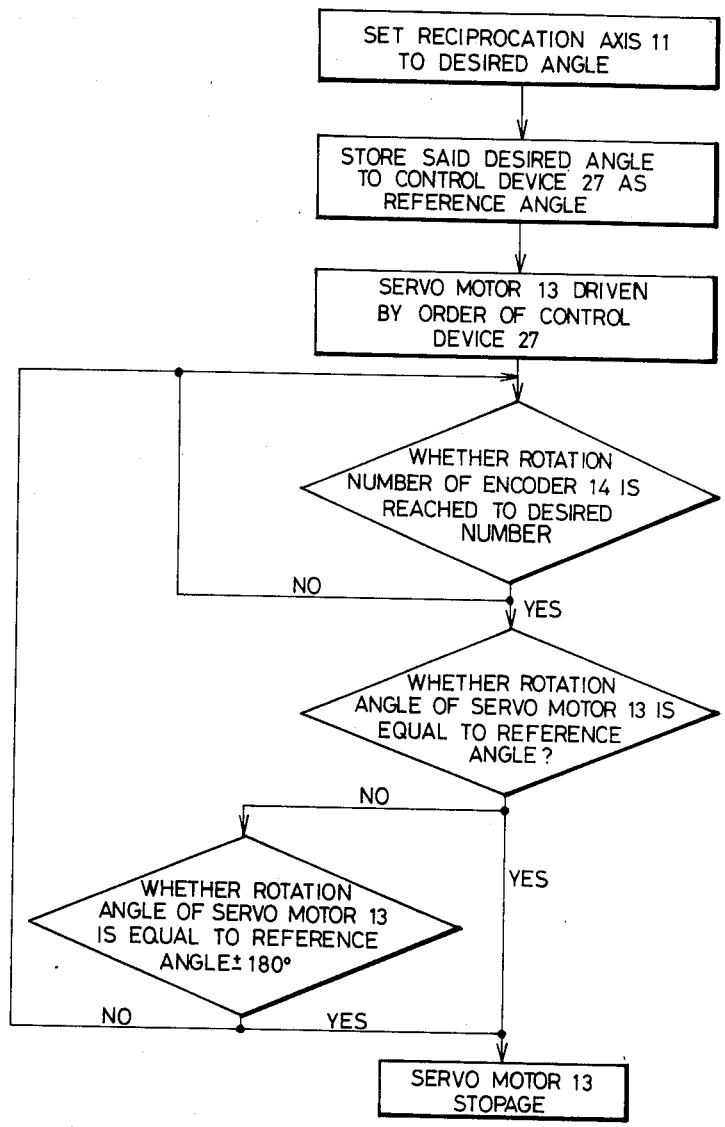
FIG. 5 is a flow-chart thereof.

FIG. 1 is a longitudinal cross-section view for illustrating a first embodiment being applicable for a table feed apparatus of a small internal grinder machine of this invention. FIGS. 2 and 3 are respectively a disassembled and an assembled perspective view for illustrating an eccentric cam mechanism forming a main part of invention. FIGS. 4 and 5 are a system block diagram and/or flow-chart with reference to control of the eccentric cam mechanism.

In the drawings, 1 is a table base and 2 is a grinder wheel table which is forwardly and/or backwardly slidably mounted upon the table base. On the upper portion of table 2, a high-frequency spindle motor 3 is mounted and a grinder wheel axle 3a is shown extending therefrom which is faced opposite to a main spindle (not shown). On the under surface of the table 2, a servo-motor 4 for driving the table is secured and on the rotation axis or axle 5 of servo-motor 4, there is provided a ball-screw 6 with a certain lead angle, and the ball-screw 6 meshes with a nut 7.

Accordingly, as the servo-motor 4 rotates against the nut 7, the grinder table 2 exerts a reciprocal movement or so-called traverse movement through the ball-screw mechanism such that it causes the table 2 to rapidly reciprocate between a stand-by or non-working position and a working position. Furthermore, said servo-motor 4 is provided with an encoder 8 thereon and by said encoder 8, it reads the number of rotations or revolutions of servo-motor 4 and by an order signal of a control device (FIG. 4), it controls the drive of servo-motor 4, and it makes the traverse movement accurate. Said nut 7 is held on a nut holder 7a and the nut holder 7a is connected to an eccentric cam mechanism 10 via a connecting plate 9.

The eccentric cam mechanism 10 is comprised of a reciprocation axis or axle 11 being mounted to the table base 1 via a bearing 12, a servo-motor 13 for rotationally driving the reciprocation axle, and an encoder 14 being operable to read the rotation position of the servo-motor 13. The upper end of reciprocation axle 11 is connected to the eccentric cam mechanism 10. Thus, as the servo-motor 13 rotates, it causes the connection plate 9 to be reciprocatably moved through the eccentric cam mechanism 10 and thereby causes the grinder wheel table 2 to undergo the same reciprocation or so-called oscillation movement.

Next, a construction of the eccentric cam mechanism 10 will be explained in detail in accordance with FIGS. 2 and 3.

On the upper end of the reciprocation axle 11, a flange 11a is formed and on the protruded end of flange 11a, a cam axis or axle 11b is integrally provided being eccentric by a predetermined amount with reference to the cam axle 11b and a cylindrical cam plate 15 and is engagedly mounted therewith and a cam block 17 surrounds the outside thereof via rollers or roller bearings 16. This cam block 17 is located within the slide-ring 18.

Reference numeral 19 points to an adjustment plate which is mounted on the upper surface of cam plate 15 so as to interposedly fix the cam plate 15 between itself and the flange 11a. Upon the adjustment plate 19, there is provided a pair of elongated holes 19a, 19a being opened to the direction perpendicular to the transferring direction of grinder wheel table 2. Along the elongated holes 19a, adjustment screws 21, 21 are threaded. Thus, the cam plate 15 is constructed so that it is possible to adjust the eccentricity against the cam axle 11b. Reference numeral 20 (FIG. 2) is an operation nub.

The slide-ring 18 is rectangularly shaped and is linearly reciprocatably transferred along rollers (not shown) provided within the table base 1. A pair of cam follower blocks 22, 23 are provided in the forward and backward direction of slide-ring 18.

On the end of cam block 17, one bearing receiving recess 17a is provided and on another end thereof, two bearing receiving recesses are provided and within said bearing receiving recesses 17a, needle bearings 24 are engagedly mounted. Axles 25 are inserted from the upper side and the end of each axle is secured by an E-ring 26 such that each axle is rotatably mounted and in such a manner that the outer portion of each needle bearing 24 protrudes a little from the outer surface of cam plate 17. Thus, the cam follower blocks 22, 23 are contacted by the outer portion of needle bearings 24 at three points.

In a state when the grinder table 2 advances at its most forward position, as shown in FIG. 1, by the driving of servo-motor 4 for driving the table, if the servo-motor 13 for rotationally driving the reciprocation axle 11 is driven, the cam block 17 and slide-ring 18 unit reciprocates due to the eccentricity of cam plate 15 relative to the reciprocation axle 11 and thus it is possible for the grinder table 2 to execute a small oscillation movement.

Next, a control means of said eccentric cam assembly and a control operation will be explained with reference to the system block diagram of FIG. 4 and the flow-chart of FIG. 5.

For the first embodiment of this invention, control is carried by a control device 27 to control the motor 4 for driving the table which causes a traverse movement of the grinder table 2 and to control the motor 13 for driving the recirocation axle which causes an oscillation movement of grinder table 2. The control device 27 consists of a micro computer in which is stored a programmable controller, and thus it is possible to control the initiation and/or stoppage of the driving of the table drive motor 4 and the reciprocation axle drive motor 13.

The control operation of the eccentric cam assembly will now be explained with reference to FIG. 5.

First, the reciprocation axle 11 is set to a predetermined rotation position and thereby, the cam plate 15 is located to the center of eccentricity. This is designated as a reference position or reference angle. The reference angle of rotation of the reciprocation axle and servo-motor 13 is read by the encoder 14 and is stored within the control device 27.

Thus, the servo-motor 13 is driven in accordance with the order of control device 27 and the grinder table 2 exerts an oscillation movement during a predetermined time in accordance with the rotation movement of cam plate 15. The encoder 14 reads the rotation number of servo-motor 13 and when it reaches a predetermined number of rotations, the servo-motor 13 stops due to the order of control device 27, and the oscillation movement of grinder table 2 stops. The control device 27 undergoes a timing control so that the servo-motor 13 can stop at the angle that is equal to the reference position (reference angle) the angle being prestored within the control device 27 and/or equal to the phase angle ±180°.

As for the eccentric cam assembly 10 of this embodiment of this invention, the adjustment holes 19a, which are provided on the adjustment plate 19, are linearly provided so as to be perpendicular to the reciprocating direction of grinder table 2 such that the eccentric stroke adjustment of the eccentric cam is carried out by use of the adjustment holes 19a, after setting the reciprocation axle 11 to the reference position. Additionally, the holes 19a are arranged along the direction perpendicular to a transferring direction of grind wheel table 2 so that if the reciprocation axle 11 rotates by 180° from its reference position, the cam plate 15 is normally restrained to the reference position and thus, the grinder table 2 is accurately positioned to its stop position.

Next, a second embodiment of this invention will be explained in accordance with FIG. 6 and following.

Figure 6:
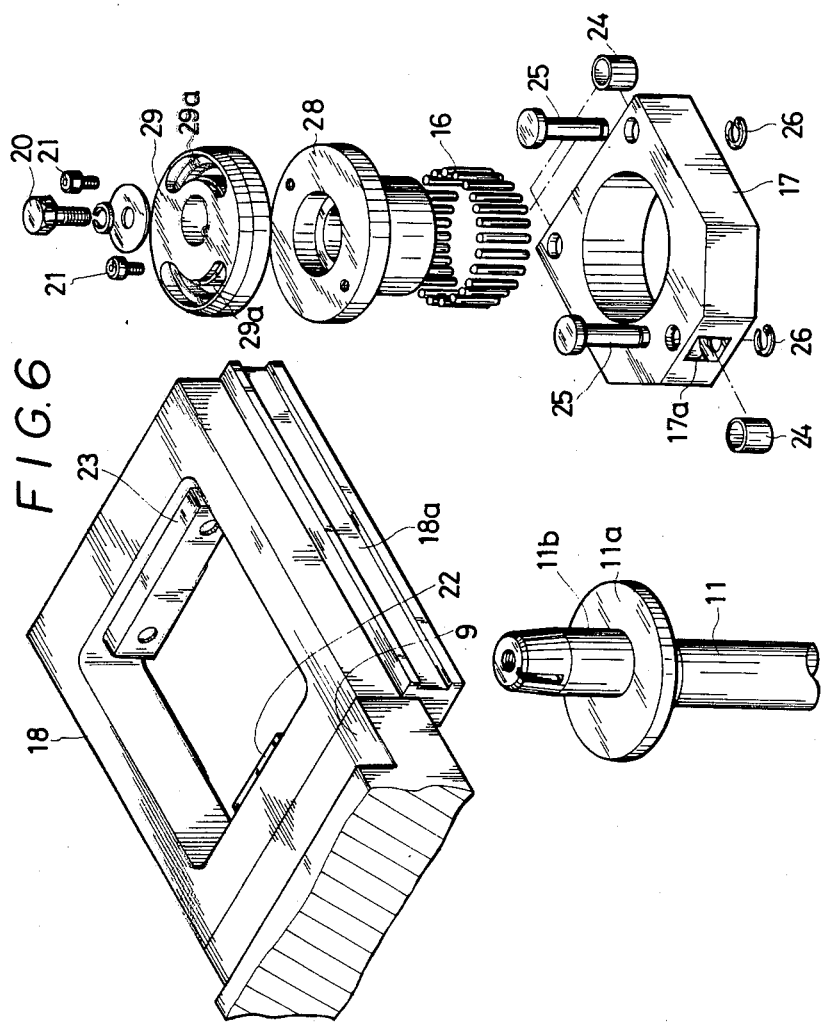
FIG. 6 is a disassembled perspective view of the main part of a second embodiment to which this invention is applied.
Figure 7:
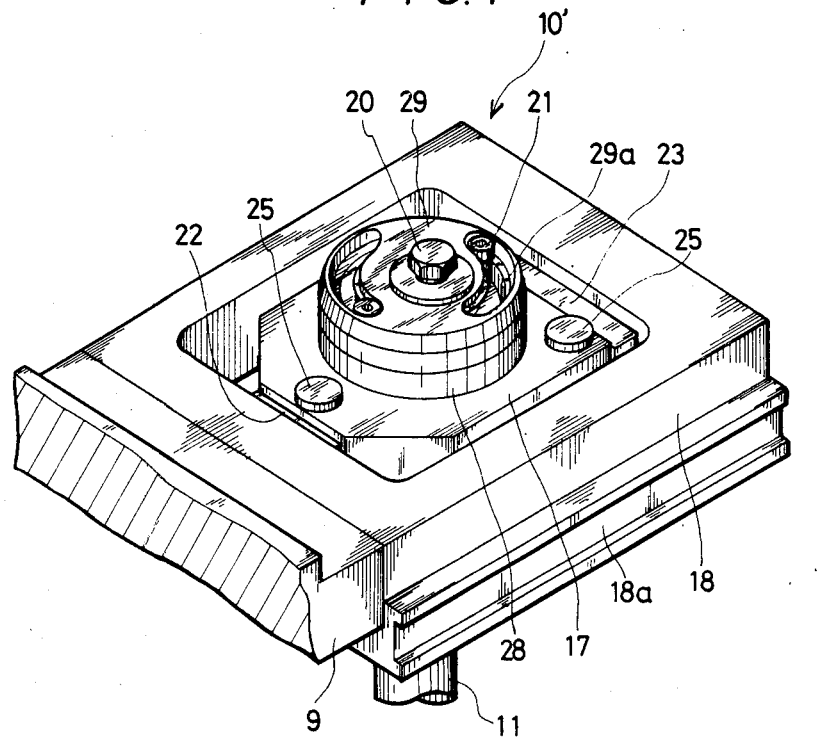
FIG. 7 is a perspective view of FIG. 6 to illustrate the assembled state thereof.
Figure 8:
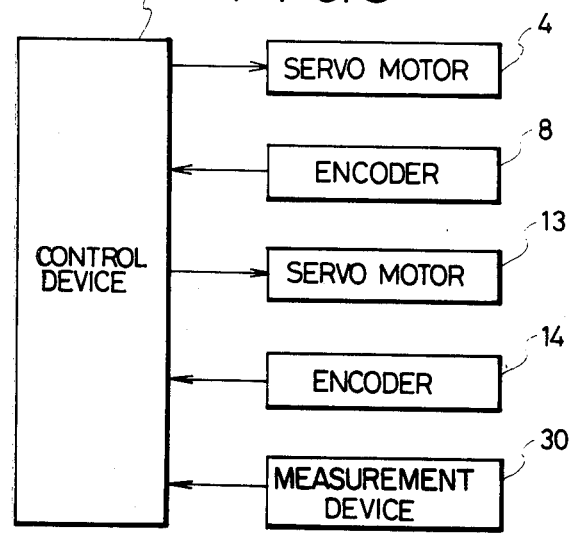
FIG. 8 is a system block diagram of the second embodiment.

FIG. 6 is a disassembled perspective view of an eccentric cam assembly. FIG. 7 is a perspective assembly, view of the eccentric cam assembly FIG. 8 is a system block diagram of an eccentric cam assembly control means, and FIG. 9 is a flow-chart of its control operation. Like parts as in the first embodiment are designated by the same reference numbers and so description thereof is omitted. The first embodiment discloses a single cam assembly, and this embodiment discloses a double eccentric cam assembly.

The cam plate 28, which is engagedly secured to the cam axle 11b, is made from a plate whose inner diameter and outer diameter is eccentric by a predetermined amount. The shape of adjustment hole 29a, which is provided to the adjustment plate 29 in order to secure the cam plate 28 from the upper side, is formed to be arcuate. When there is need to adjust the eccentricity amount, the cam plate 28 is rotated against the cam axle 11b by the predetermined angle and the adjustment thread 21 is threadably mounted to the arcuate hole 29a such that it becomes possible to get a desired eccentric stroke.

Thus, this embodiment has a double eccentricity assembly construction with double eccentricities being comprised of an eccentricity of the cam axle 11b as against the reciprocation axle 11 and an eccentricity of the inner cam plate 28 as against the cam axle 11b.

The fundamental elements and their functions are the same in the above-mentioned embodiment such that detailed description thereof is omitted.

Next, the control means and control operation of said double eccentric cam assembly 10 will be explained with reference to FIGS. 8 and 9.

A system block diagram in FIG. 8 is basically the same as in the first embodiment in FIG. 4, but it is accompanied with a potentiometer (measurement device) 30 for detecting an eccentric stroke of the eccentric cam.

The fundamental operating features are comprised of a means for detecting the eccentric stroke of the eccentric cam by use of a measurement device 30, a setting of the center of the eccentric stroke as a reference point, the rotation angle of servo-motor 13 corresponding to said reference point being memorized within the control device 27, and executing a timing control so as to stop the eccentric cam or the reciprocation axle at a certain rotation angle as a reference angle when the oscillation movement is stopped.

Accordingly, as clearly demonstrated in the flow-chart of FIG. 9, it rotates the servo-motor 13 by one revolution, and it detects the eccentric stroke thereof by use of a measurement device 30. Further, it defines a reference point with a center point of eccentric stroke, and it reads a rotation angle of the servo-motor 13 corresponding to said reference point by use of the encoder 14, and it causes the control device 31 to memorize same. Also, it drives the servo-motor 13 due to the order of control device 27, and it initiates the oscillation movement of the grinder wheel table 2.

The second embodiment reads a rotation number of servo-motor 13 by use of the encoder 14 and it executes the oscillation movement in a predetermined time and thereafter, it stops the driving of servo-motor 13 due to the order of control device 27 and thus, it stops the oscillation movement. But, the timing order signal of stoppage is applied thereto from the control device 27 so that it is possible to stop when it matches with the certain angle of servo-motor 13 as said reference point and/or it is in a phase angle ±180°.

Therefore, the cam plate 28 is normally returned to the eccentricity center position when the oscillation movement is stopped and thereby, it becomes possible to accurately position the grinder wheel table 2 and to rapidly carry out the successive stroke adjustment operation of the eccentric cam.

Additionally, in the first and second embodiments, the servo-motor 4 for driving the table is secured under the grinder wheel table 2 and the nut 7 being engageable with the ball-screw 6 is mounted upon the inner side of the table base, but it is alternately allowed that the nut be secured under the grinder wheel table and the servo-motor for driving the table be mounted upon the side of the table base. The foregoing and other changes in said table feed device can be made appropriately by those skilled in the art.

As described and set forth above, the table feed apparatus due to this invention employs a servo-motor and ball-screw assembly in order to drive the traverse movement of a grinder wheel table and employs an eccentric cam assembly in order to effectuate the oscillation movement of the table such that it becomes possible both to carry out a low speed feed operation especially in the internal grinder machine and the like and to carry out a high speed oscillation operation. Thus, the flexibility of grinder processing is extremely improved.

In cases where the oscillation operation is performed with the prior art eccentric cam assembly, it is impossible to accurately position the grinder wheel table during stoppage of the oscillation operation. But, due to this invention, by causing the eccentric cam to stop at a predetermined angle, it is possible to always position the table at its accurate position during stoppage of the oscillation operation such that it becomes possible to rapidly execute successive eccentricity adjustment operations. Thus, this invention is extremely practical and especially applicable to the internal grinder machine.

What is claimed is:

1. A table feed apparatus of the type which converts rotation of a table drive motor into reciprocal movement of a grinder wheel table through a ball-screw assembly to thereby impart a traverse movement to said grinder wheel table between a non-working position and a working position and converts rotation of a reciprocation axle drive motor into reciprocal movement of said table through an eccentric cam to thereby impart an oscillation movement to said grinder wheel table when the table is in the working position; characterized in that a drive control means of said eccentric cam comprises an encoder for effecting reading of a rotation position of said reciprocation axle drive motor, and a control device for controlling the rotational drive of said reciprocation axle drive motor so as to be effective to stop the eccentric cam at a predetermined angle.

2. A table feed apparatus according to claim 1, wherein said eccentric cam comprises a cam axle eccentrically extending from said reciprocation axle, a cam plate engagedly mounted to said cam axle and a slide-ring slidably connected to an outer surface of said cam plate for converting a rotation of said cam plate into an oscillation operation of said grinder wheel table through said slide-ring, adjustment of the amount of eccentricity of said eccentric cam being carried out by causing said cam plate to slide against said cam axle along a direction perpendicular to a transfer direction of said grinder wheel table.

3. A table feed device according to claim 1, wherein said eccentric cam comprises a cam axle eccentrically extending from a reciprocation axle, a cam plate engagedly mounted to said cam axle and having inner and outer diameters which each have their own respective amounts of eccentricity, and a slide-ring which is slidably connected to an outer surface of said cam plate and which converts a rotation of said cam plate into an oscillation operation of said grinder wheel table through said slide-ring, adjustment of the amount of eccentricity of said eccentric cam being carried out by causing said cam plate to rotate around said cam axis by a predetermined rotation angle, and a control means for driving said eccentric cam comprised of an encoder mounted on said reciprocation axle drive motor and operable to read a rotation position of said drive motor, a measurement device which detects an eccentricity amount of said eccentric cam, and a control device which is operable to control the rotation of said reciprocation axle drive motor, said control device operable to cause said eccentric cam to stop in response to the output of said measurement device at a certain angle, said angle being the center position of the amount of eccentricity.

4. A grinder wheel table control apparatus comprising a grinder wheel table reciprocally mounted on a table base and controlled for reciprocation by a servomotor, an encoder, and a ball-screw and nut arrangement, said ball-screw and nut arrangement being fixedly attached to a cam assembly comprising a slide-ring, a cam block, a reciprocation axle extending from a reciprocation axle drive motor, a second encoder mounted beneath said reciprocation axle drive motor, said cam axle extending from an upper end of said reciprocation axle and eccentric thereto, a cam plate journaled for rotation in said cam block, and an adjustment plate provided with a pair of elongated adjusting holes mounted on said cam plate, said second encoder operable to read a rotation position of said reciprocation axle drive motor and to report said position to control device means for controlling the rotational drive of said reciprocation axle drive motor effecting a stop of said cam plate at a predetermined angle.

5. The table control apparatus of claim 4 and further comprising adjustment means for adjusting the amount of eccentricity of said eccentric cam, said adjustment means comprising means for adjusting said cam plate to slide against said cam axle along a direction perpendicular to a transfer direction of said grinder wheel table.

6. The table control apparatus of claim 4 and further comprising a double eccentricity assembly wherein said cam axle is eccentric with reference to said reciprocation axle and said cam plate is eccentric with reference to said cam axle.

7. A table feed apparatus comprising: a table mounted to undergo sliding movement between a stand-by position and a working position; first drive means for driving the table between the stand-by and working positions; second drive means for reciprocatingly driving the table while the table is in the working position, the second drive means comprising a controllable rotary motor for producing a rotary output about a given axis of rotation, an eccentric cam, means mounting the eccentric cam for rotational eccentric movement about the given axis of rotation, means for converting the rotational eccentric movement of the eccentric cam into reciprocating movement of the table; and control means for controlling the operation of the rotary motor to stop the rotation thereof after a preselected number of reciprocating movements of the table, the control means including means for stopping the rotation of the rotary motor such that the eccentric cam stops its rotational eccentric movement at a predetermined angular position.

8. A table feed apparatus according to claim 7; wherein the means for stopping comprises means for detecting the eccentricity of the eccentric cam, and means for stopping the rotation of the rotary member in response to the detected eccentricity.

9. A table feed apparatus according to claim 7; wherein the means for stopping comprises means for detecting the eccentricity of the eccentric cam and producing an output signal corresponding to the detected eccentricity, means responsive to the output signal for storing data representative of the angular position of the rotary motor corresponding to the detected eccentricity of the eccentric cam, and means for controlling the operation of the rotary motor in accordance with the stored data.

10. A table feed apparatus according to claim 9; wherein the means for detecting comprises means for detecting the center point of the eccentric stroke of the eccentric cam and producing an output signal corresponding to the detected center point.

11. A table feed apparatus according to claim 7; wherein the control means for controlling the operation of the rotary motor comprises means for detecting the number of revolutions of the rotary motor, and means for stopping the rotation of the rotary motor when the detected number of revolutions corresponds to the preselected number of reciprocating movements of the table.

12. A table feed apparatus according to claim 7; wherein the means mounting the eccentric cam includes means mounting the eccentric cam to enable adjustment of the eccentricity thereof with respect to the given axis of rotation.

* * * * *